(12) United States Patent
Lentini et al.

(10) Patent No.: US 6,614,131 B2
(45) Date of Patent: Sep. 2, 2003

(54) POWER SUPPLY WITH MAGNETIC RESET OF SATURABLE AMPLIFIER

(75) Inventors: Franco Lentini, San Gregorio (IT); Fabrizio Librizzi, Palermo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/055,006

(22) Filed: Jan. 22, 2002

(65) Prior Publication Data
US 2002/0114175 A1 Aug. 22, 2002

(30) Foreign Application Priority Data
Jan. 22, 2001 (EP) .............................. 01830032

(51) Int. Cl.[7] ................................. H02J 1/00
(52) U.S. Cl. ........................... 307/39; 363/91
(58) Field of Search ................. 363/81, 82, 21.1, 363/91, 75; 307/39, 31

(56) References Cited

U.S. PATENT DOCUMENTS

| | | | |
|---|---|---|---|
| 4,626,976 A | * 12/1986 | Abe et al. | 363/19 |
| 4,642,743 A | 2/1987 | Radcliffe | 363/21 |
| 4,931,920 A | * 6/1990 | Barker | 363/82 |
| 5,126,931 A | * 6/1992 | Jitaru | 363/21.04 |
| 5,612,862 A | 3/1997 | Marusik et al. | 363/93 |
| 6,449,176 B1 | * 9/2002 | Kakuda | 363/91 |

FOREIGN PATENT DOCUMENTS

| | | |
|---|---|---|
| EP | 0 471 421 A2 | 2/1992 |
| JP | 11-252911 | 9/1999 |

* cited by examiner

*Primary Examiner*—Shawn Riley
(74) *Attorney, Agent, or Firm*—Lisa K. Jorgenson; E. Russell Tarleton; Seed IP Law Group PLLC

(57) ABSTRACT

A switched mode power supply having a first circuit provided with a primary winding of a transformer to which a pulse voltage is applied, a second circuit having a secondary winding of the transformer, a reactor provided with a magnetic core and which has a terminal connected to a terminal of the secondary winding, at least one filter provided with input and output terminals and a first diode connected in parallel to the input terminals of the filter is shown. The other terminal of the reactor is connected to a terminal of the first diode. The power supply includes a second diode that has a first terminal connected to the other terminal of the first diode and a second terminal connected to the other terminal of the secondary winding and a control circuit coupled to an output terminal of the filter and to the other terminal of the secondary winding. The control circuit generates a current able to reset the magnetic core of the reactor.

19 Claims, 11 Drawing Sheets

POWER SUPPLY WITH MAGNETIC RESET OF SATURABLE AMPLIFIER

BACKGROUND OF THE INVENTION

1. Field of the Invention

The present invention relates to a switched mode power supply.

2. Description of the Related Art

The general present tendency to reduce the sizes of the electronic devices requires power supplies that produce a low voltage that is stable and precise and will have a small size and good efficiency. Among such types of power supplies are those so-called in switched mode (switched mode power supplies). Shown in FIG. 1 is a typical power supply that comprises a circuit 100 with a primary winding 101 of a transformer and with a respective input voltage Vin, and which further comprises three circuits 200, 300 and 400, each provided with a secondary winding 201, 301, 401 of the transformer and producing an output voltage Vo1, Vo2, Vo3 at the terminals of a respective load. The main output Vo1 of the circuit 200 is regulated by a fixed frequency PWM controller 102, which is placed in feedback between the output Vo1 and the circuit 100 provided with the primary winding. The PWM controller 102 regulates the output voltage Vo1 with respect to each change of the input voltage Vin and to each change of a load LD, while as regard to the output voltages Vo2 and Vo3, each change of the input voltage Vin is regulated by the action of the PWM controller 102, but the changes of the loads relating to the voltages Vo2 and Vo3 are not considered by the PWM controller because the circuits 300, 400 are in open loop configuration with respect to the circuit 100. Post regulators 302, 402, as, for example, linear regulators, DC/DC converters, magnetic amplifiers (mag-amps), are necessary to regulate the voltages Vo2 and Vo3 with respect to the changes of the load.

The linear regulators represent a simple and easy-to-design solution. However they present a low efficiency, and for this reason they are utilized above all in low current applications.

The DC/DC converters can be an efficient solution because they allow a good regulation of the output voltage. However they show considerable drawbacks due to the cost of the DC/DC converter, which includes power switches, inductors, capacitors and controllers. Also the DC/DC converter generates added noise and added disturbances which require added filters.

The magnetic amplifiers can be considered as post regulators provided with a programmable delay switch. In fact the magnetic amplifiers have the capability to block some volt/second values of the input voltage to provide a smaller output duty-cycle than the input duty-cycle. The blocked volt/second value depends on the magnetic amplifier feedback loop that controls the output voltage by resetting the saturable core. The magnetic amplifiers generally comprise a reactor provided with a magnetic core and with a control circuit able to reset the magnetic core.

A typical application of a magnetic amplifier consists of a multi-output forward converter shown in FIG. 2 (which includes a portion of the circuit of FIG. 1), where the primary 101 of the transformer, which receives in input the voltage Vin, is placed in series to a switch MOS M1 at the gate terminal of which a voltage signal is present, which is the output voltage Vo1 of the circuit 200 comprising the secondary winding 201 of the transformer, which is regulated by the fixed frequency PWM controller 102. A second circuit 24, which is similar to one of the circuits 300 or 400 of FIG. 1, comprises a secondary winding 25 of the transformer, a reactor 26 provided with a magnetic core and connected to the winding 25 and to the anode of a diode D1; the cathode of the diode D1 is connected to the cathode of a diode D2 placed in parallel to a filter LC and which has the anode connected to the secondary winding 25. A control circuit 27 is connected to the common terminal of the inductance L and of the capacitor C of the filter LC and it is coupled to the anode of the diode D1 by means of another diode D3 placed so that its cathode is connected to the anode of the diode D1. The voltage signal VD2 present at the terminals of the diode D2 is a pulse width modulated waveform which provides a continuous output signal Vo. The pulse width of the signal VD2 is controlled by the duty-cycle of the switch MOS M1 and by the saturable reactor 26. When the reactor 26 is in an unsaturated state (off state) it blocks the voltage Vs1 at the terminals of the secondary winding 25, while, when the reactor 26 is in a saturated state (on state), it shows a low impedance and therefore it blocks a small part of the voltage Vs1.

In FIG. 3 the time diagrams of the voltages and currents associated with the line of the circuit of FIG. 2 for the continuous inductor conduction mode (CCM) are shown; the voltage Vs1 at the terminals of the secondary winding 25, the voltage Vs2 between the anode of the diode D1 and ground, the voltage Vma which is the difference between the voltages Vs1 and Vs2, the voltage VD2 at the terminals of the diode D2 and the current IL at the terminals of the inductance L of the filter LC are shown. The time periods ton1 and toff1 are the switching periods of the MOS switch M1, while the period Ts is the whole switching period. The time period tb is the time period during which the reactor is in off state and therefore in such period the magnetic amplifier blocks a volt/second value equal to an area B. The time period during which the reactor 26 is in on state is ton2, and in such time period the voltage VD2 at the terminals of the diode D2 is high and therefore the current IL rises. During the period tr the reactor 26 is reset by the control circuit 27. The reset area A is equivalent to the area B.

In FIG. 4 the time diagrams of the voltages Vs1, Vs2, Vma, Vd2, and of the current IL which are associated with the lines of the circuit of FIG. 2 for a discontinuous inductor conduction mode (DCM) are shown; the considerations made for the case of the continuous inductor conduction mode are still valid. However, in this case, a positive voltage equal to Vdo appears at the terminals of the diode D2 during the dead time td during which the current IL in the inductor L is zero. Also, in the DCM conduction case, the time tb is longer than that in the CCM case; this is due to the fact that in the DCM case more stresses are in the reactor 26 than in the CCM case.

In FIG. 5A the control circuit 27 is shown in more detail in the case wherein the control circuit 27 implements a voltage reset. Such circuit 27 comprises a pnp transistor Q1 the emitter terminal of which is coupled to a positive supply voltage Vcc+ and the collector terminal of which is coupled to a negative supply voltage Vcc−. The base terminal of a second npn transistor Q2 is connected to the collector terminal which has the collector terminal connected to ground and the emitter terminal connected to the anode of the diode D3. The current that flows through the transistor Q1 is controlled by means of an operational amplifier 50 which compares the output voltage Vo of the circuit 24 with a reference voltage VRef. Any variations of the output voltage Vo with respect to the reference voltage VRef causes a variation of the signal driving the transistor Q1, and it determines a change of a reset current Ir. The change of the reset current Ir causes a change of the volt/second value of the area B, causing a regulation of the output voltage Vo. The loop gain of the voltage reset circuit is approximately unity. The block Comp is configured to stabilize the system.

In FIG. 5B the time diagrams of the voltage Vs2 and of the reset current Ir, which are relative to the circuit of FIG. 5A, are shown.

In FIG. 6A the control circuit 27 of FIG. 2 is shown in more detail in the case wherein such circuit implements a current reset. Such configurations differs from the circuit configuration of FIG. 5A because a pnp transistor Q6 having the emitter terminal coupled to the positive supply voltage Vcc+ has the collector terminal connected directly to the anode of the diode D3. In such configuration the pnp transistor is utilized to provide the current Ir which must reset the core of the reactor 26. The current Ir flows in the transistor Q6 even when the voltage Vs1 is zero to allow a pre-charge of the core. The control of the current is carried out by means of the operational amplifier 50 and the reference voltage Vref. The use only of the positive supply voltage Vcc+, even if it is easier to be obtained, is bound to the regulated output voltage. This adds another loop to the system which bypasses the error compensation and makes more difficult the stabilization of the system and also the design of the compensation network.

In FIG. 6B the time diagrams of the voltage Vs2 and of the reset current Ir which are relative to the circuit of FIG. 6A are shown.

The magnetic amplifiers can be utilized in forward-derived double-ended circuit topologies as push-pull, half-bridge, full-bridge. One among such circuit topologies is shown in FIGS. 7 and 8 where the secondary of the transformer has two windings 71, 72 with two reactors 73, 74 and with two diodes D1 the anodes of which are connected to the two cathodes of the two diodes D3. Between the common anode of the diodes D3 and an output terminal of the circuit it is possible to insert a circuit which implements a voltage reset as in FIG. 7 or a circuit which implements a current reset as in FIG. 8.

BRIEF SUMMARY OF THE INVENTION

According to the disclosed embodiments of the present invention, a switched mode power supply is provided. In one embodiment of the power supply, a first circuit provided with a primary winding of a transformer to which a pulse voltage is applied, at least one second circuit comprising at least one secondary winding of said transformer, at least one reactor provided with a magnetic core and which has a terminal connected to a terminal of said at least one secondary winding, and at least one filter provided with input and output terminals and a first diode connected in parallel to the input terminals of the filter. In addition, the other terminal of the at least one reactor is connected to a terminal of the first diode, and a second diode, which has a terminal connected to the other terminal of the first diode and the other terminal connected to the other terminal of the at least one secondary winding and a control circuit coupled to a output terminal of the filter and to said other terminal of said at least one secondary winding is provided, the control circuit generating a current to reset the magnetic core of the at least one reactor.

The embodiments of the present invention form a switched mode power supply with a magnetic amplifier provided with a reset circuit that is simpler of the known circuits, which has less circuit components and which therefore allows low costs for its manufacture.

BRIEF DESCRIPTION OF THE SEVERAL VIEWS OF THE DRAWING(S)

The features and advantages of the present invention will be made evident by the following detailed description of an embodiment thereof, illustrated as a non-limiting example in the annexed drawings, wherein.

DETAILED DESCRIPTION OF THE INVENTION

Figure 1:
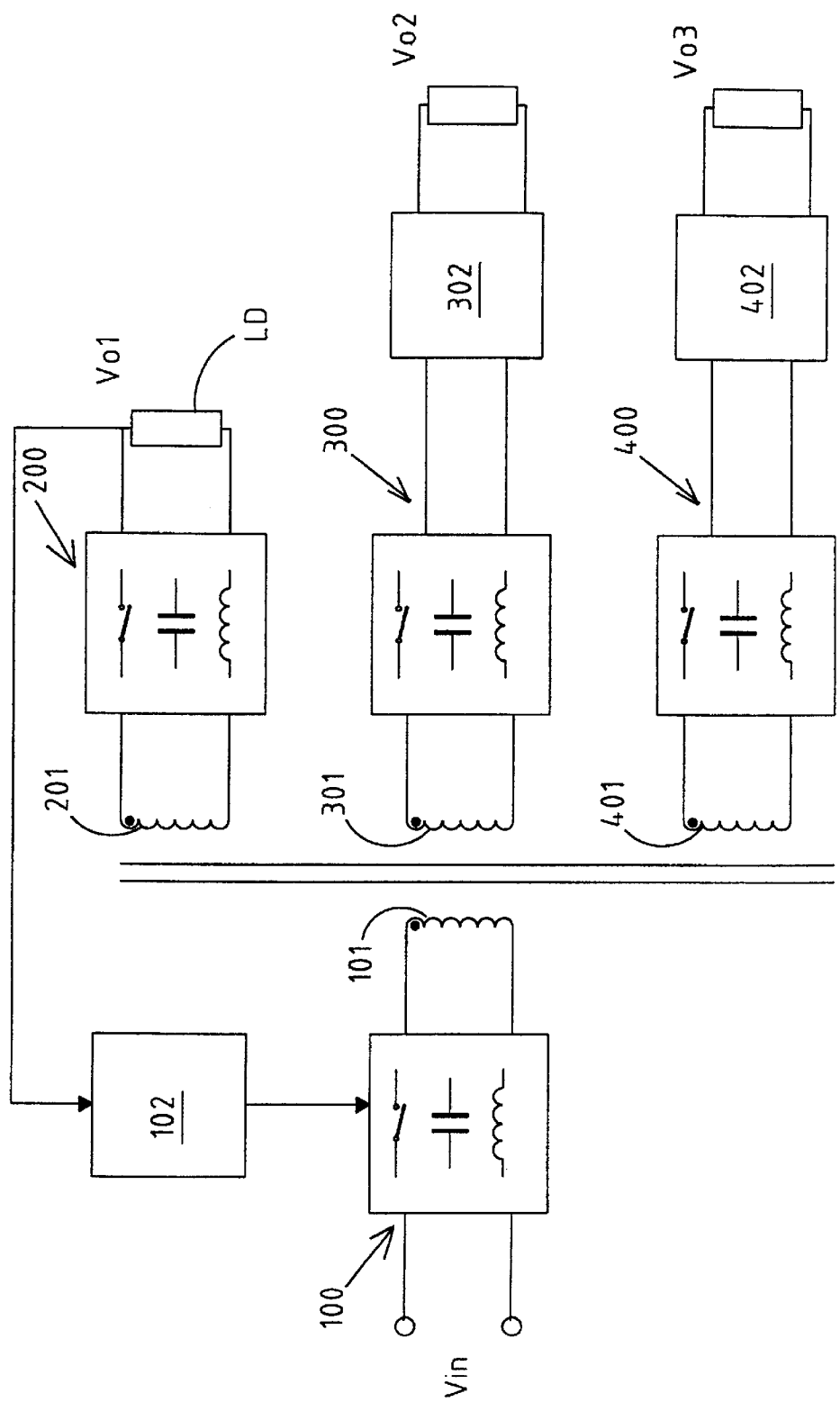
FIG. 1 is a circuit configuration of a switched mode power supply according to the prior art.
Figure 2:
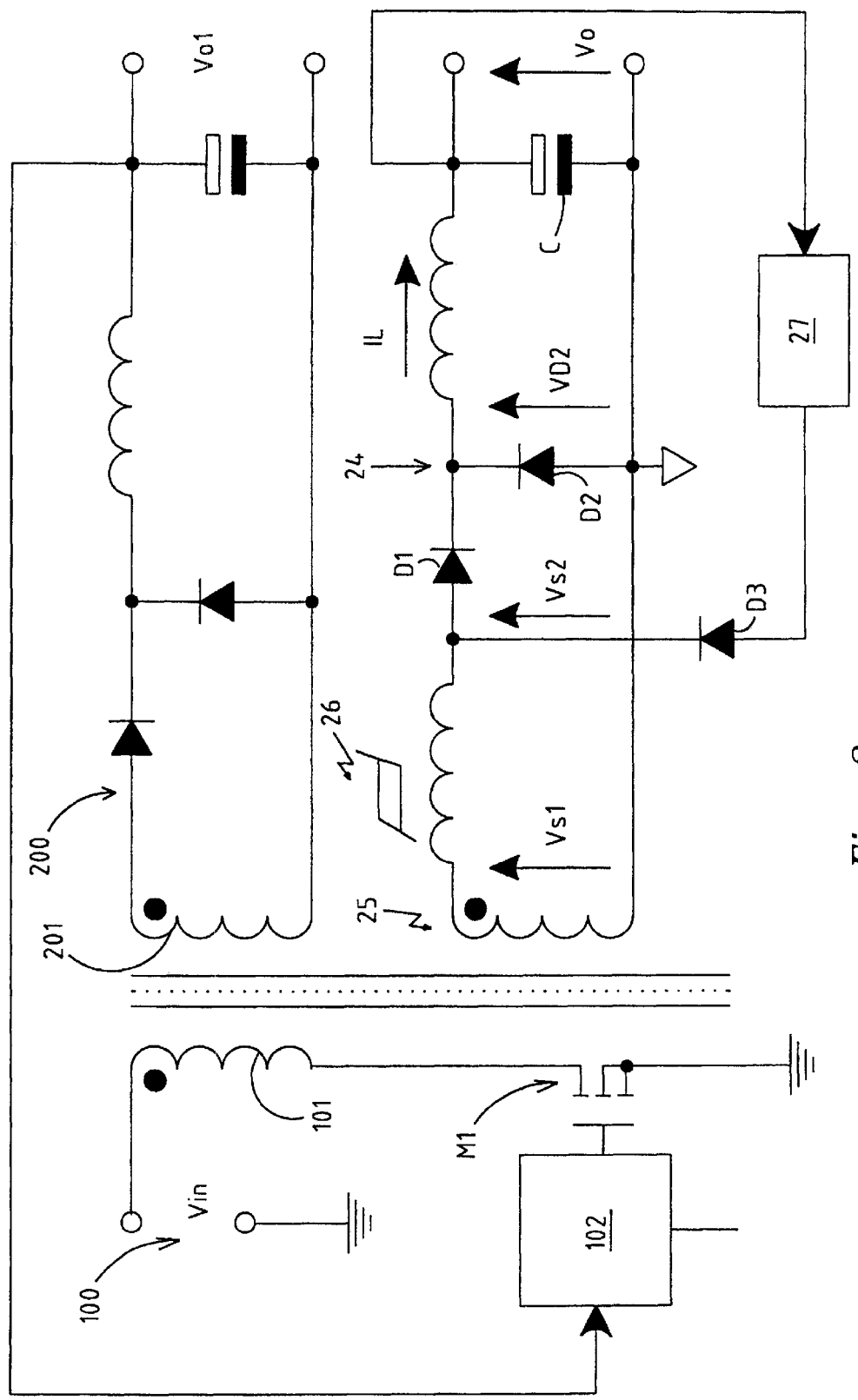
FIG. 2 is a circuit configuration of a switched mode power supply of the multi-output forward converter type according to the prior art.
Figure 3:
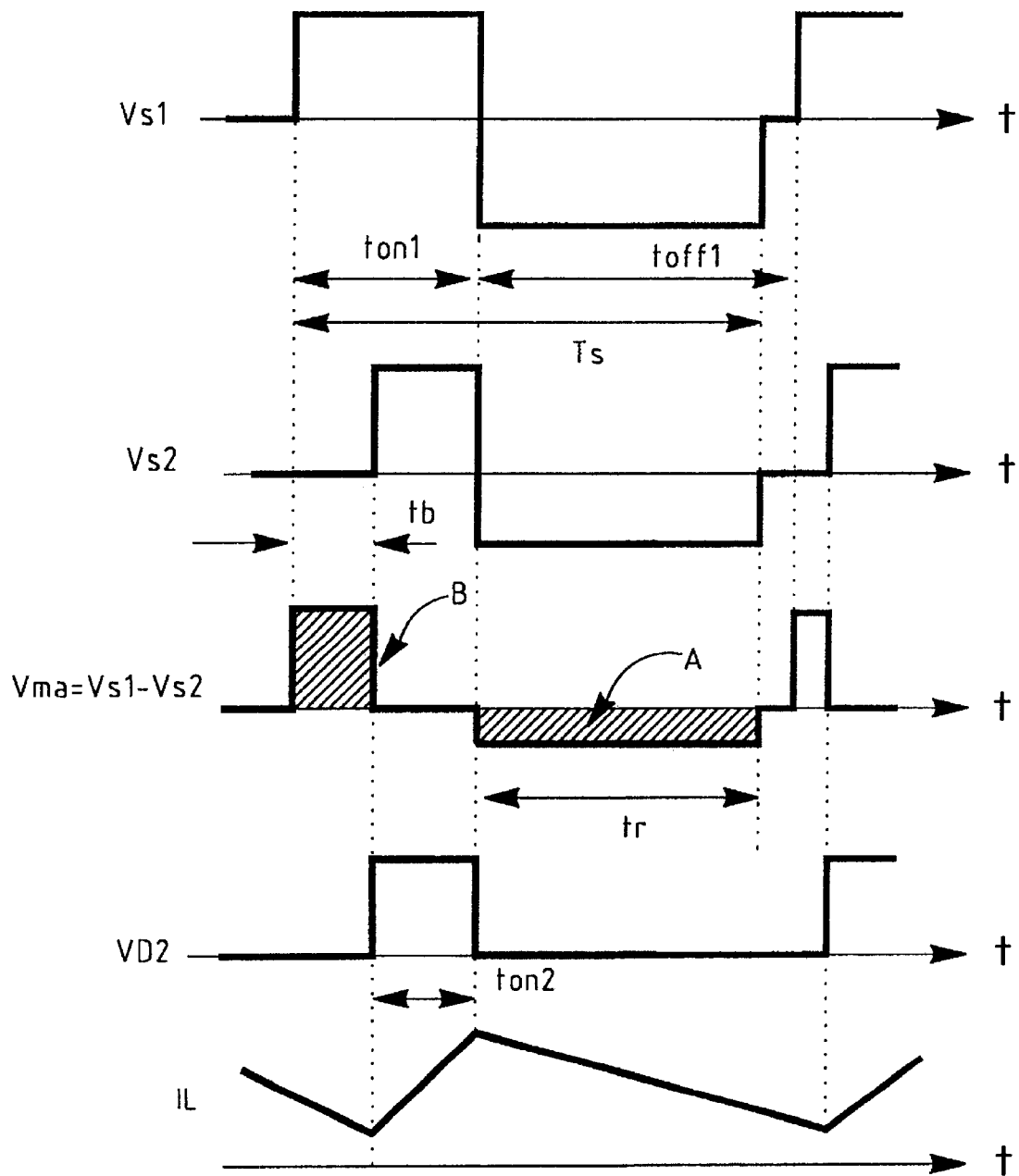
FIG. 3 shows the time diagrams of the voltages and of the currents which are associated to the lines of the circuit of FIG. 2 for a continuous inductor conduction mode (CCM) according to the prior art.
Figure 4:
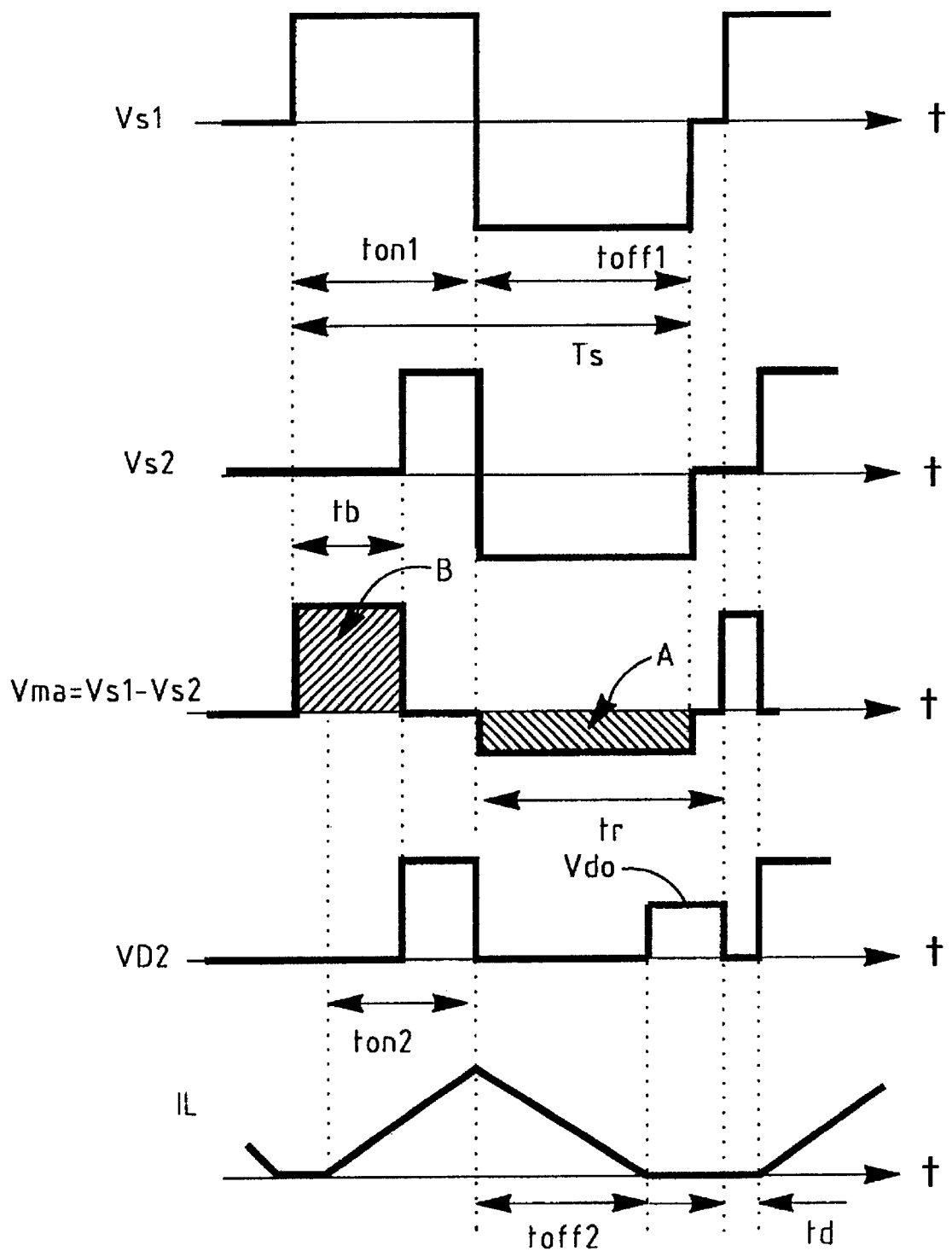
FIG. 4 shows the time diagrams of the voltages and of the currents which are associated to the lines of the circuit of FIG. 2 for a discontinuous inductor conduction mode (DCM) according to the prior art.
Figures 5A, 5B:
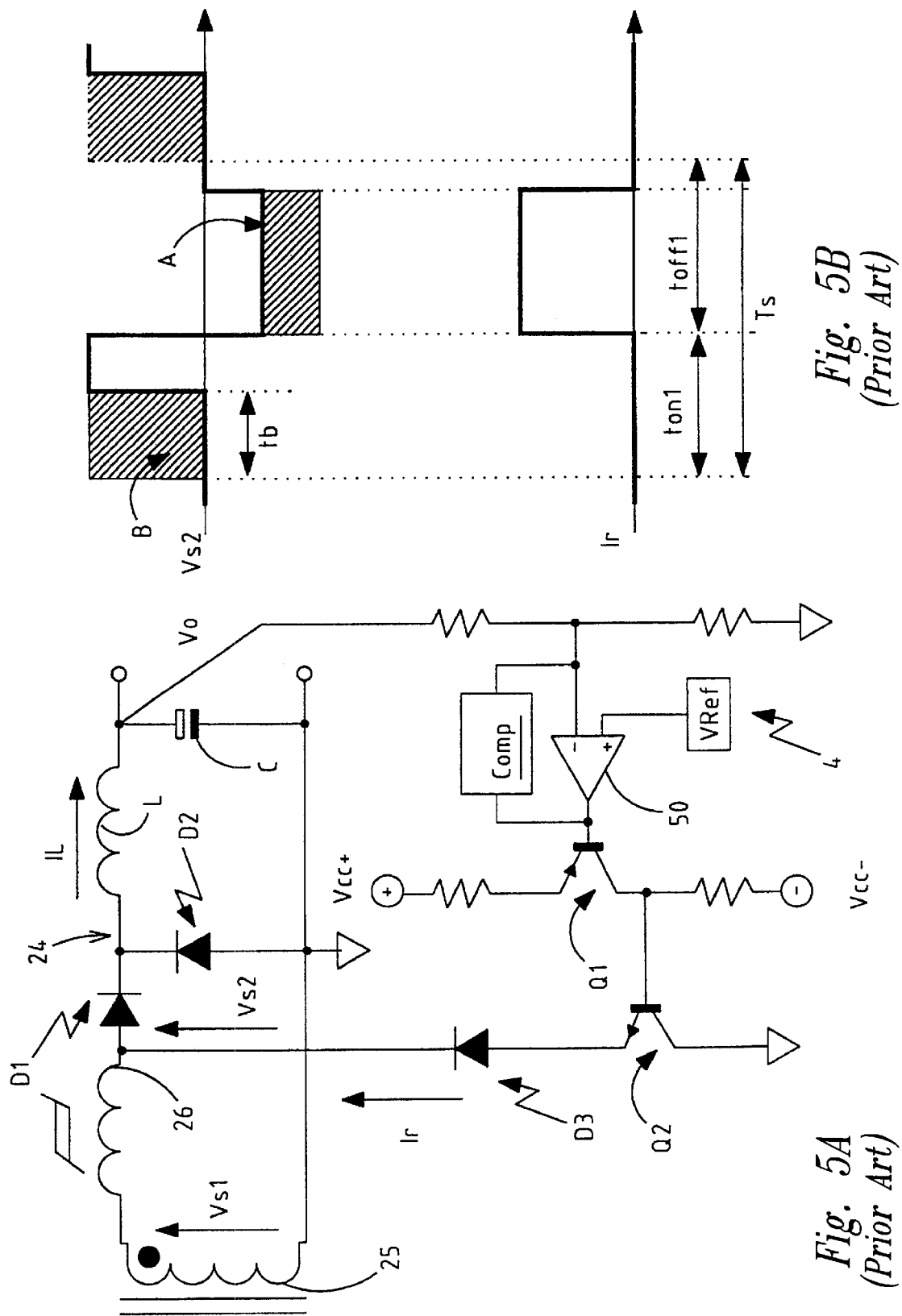
FIG. 5A shows a more detailed circuit scheme of the circuit of FIG. 2 with the use of a control circuit which implements a voltage reset according to the prior art.
FIG. 5B shows the time diagrams of the voltage Vs2 and of the reset current Ir which are relative to the circuit scheme of FIG. 5A.
Figure 6B:
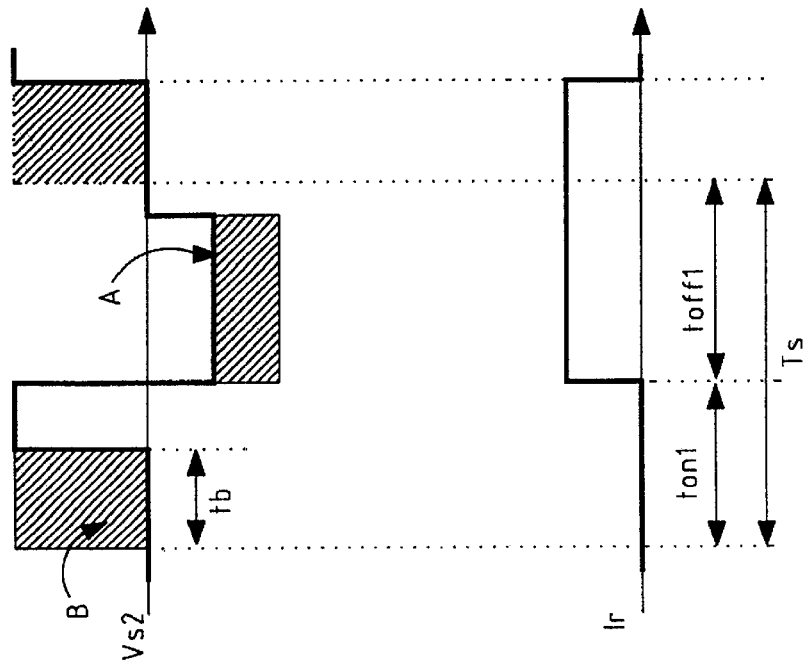
FIG. 6B shows the time diagrams of the voltage Vs2 and of the reset current Ir which are relative to the circuit scheme of FIG. 6A.
Figure 6A:
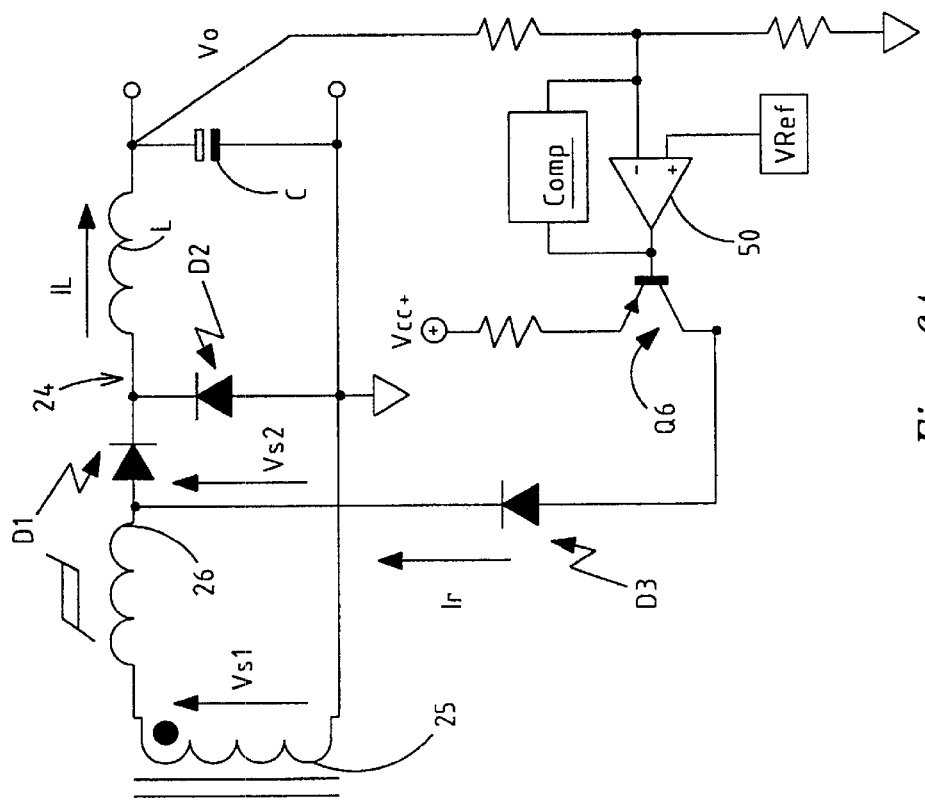
FIG. 6A shows a more detailed circuit scheme of the circuit of FIG. 2 with the use of a control circuit which implements a current reset according to the prior art.
Figure 7:
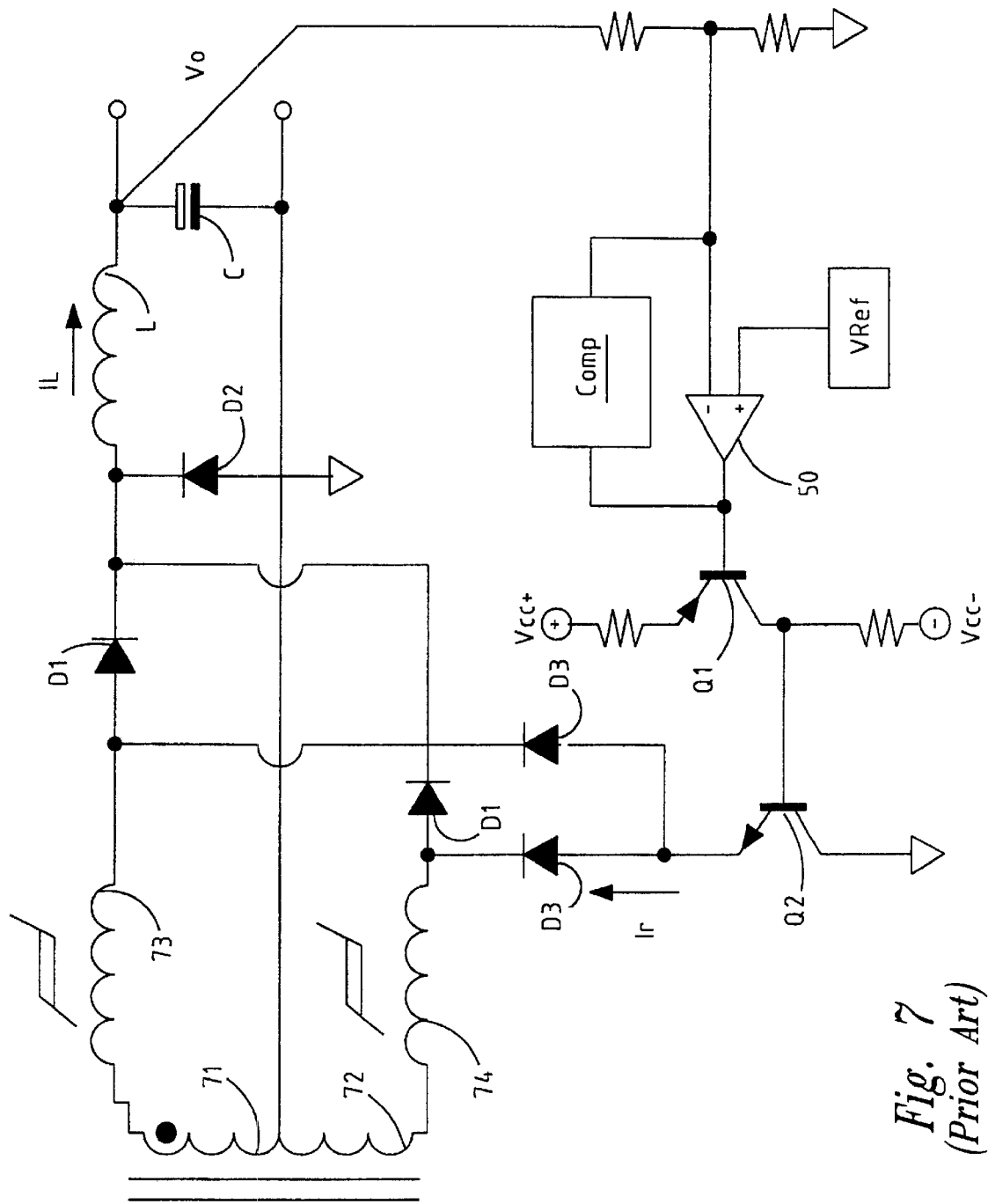
FIG. 7 shows a circuit scheme of a switched mode power supply of the multi-output forward-derived double-ended type provided with a circuit which implements a voltage reset according to the prior art.
Figure 8:
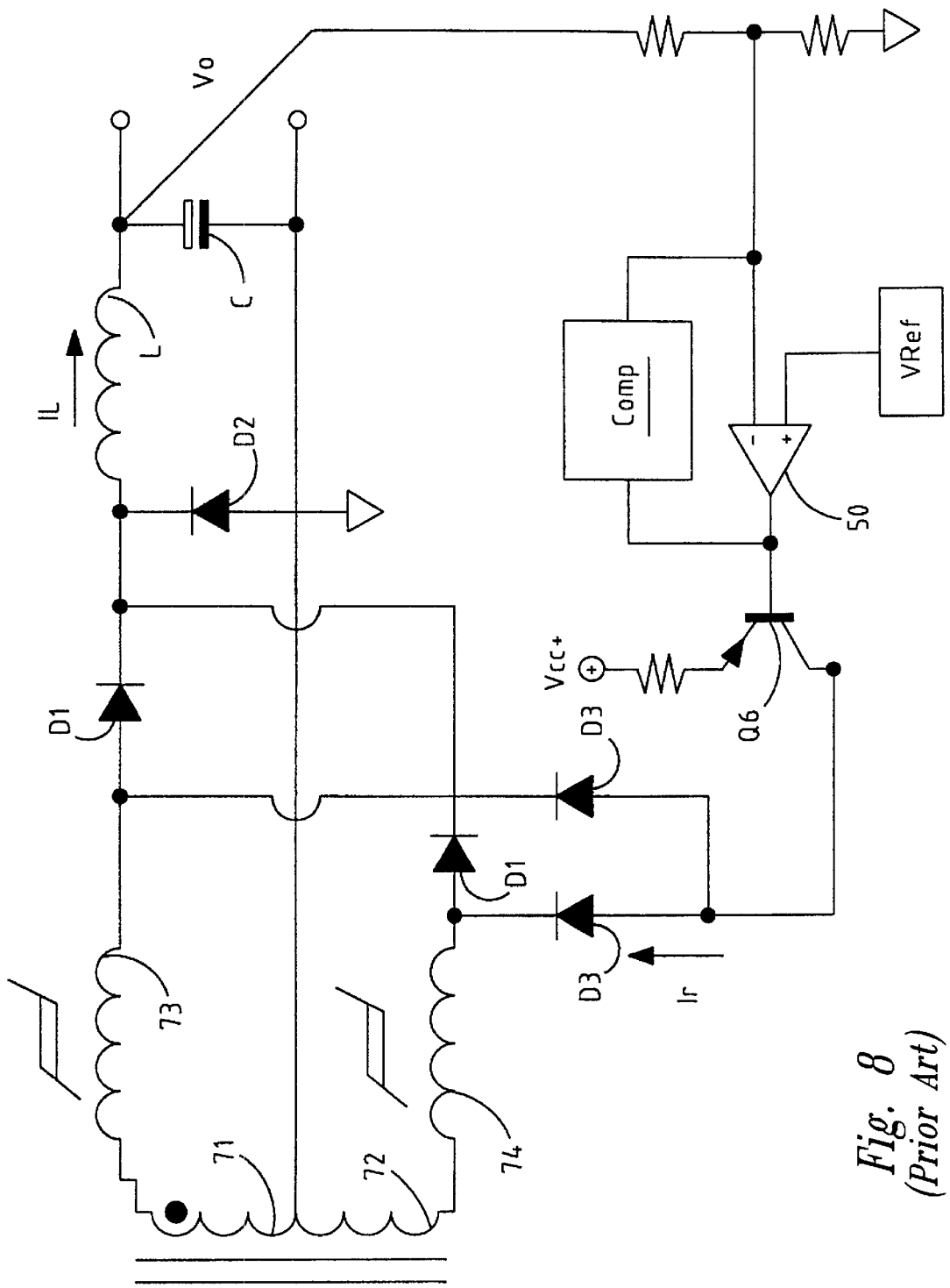
FIG. 8 shows a circuit scheme of a switched mode power supply of the multi-output forward-derived double-ended type provided with a circuit which implements a current reset according to the prior art.
Figure 9A:
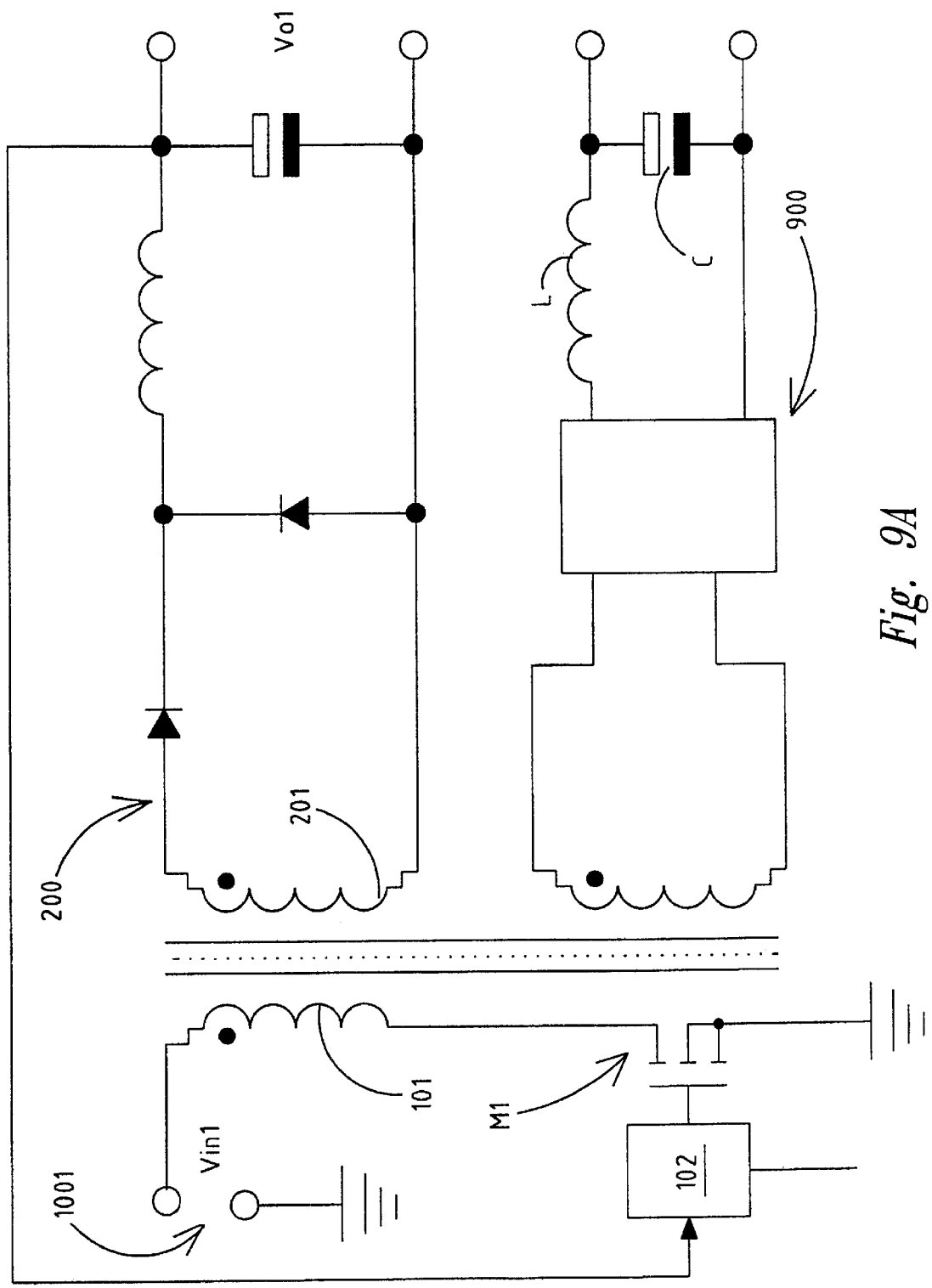
FIG. 9A is a circuit scheme of a switched mode power supply of the multi-output forward converter type according to the present invention.

Referring to FIG. 9A a circuit scheme of a switched mode power supply of the multi-output forward converter type according to one embodiment of the invention is shown. Such circuit scheme comprises, similarly to the circuit configuration of the power supply of FIG. 2 and wherein the same numerical reference indicate the equal elements of two circuit configurations of FIGS. 2 and 9A, a primary winding 101 of a transformer that receives in input a voltage Vin1. Such primary winding 101 is placed in series with a MOS switch M1 having a gate terminal on which a voltage signal is present, which is the output voltage Vo1 of the circuit 200 that includes a secondary winding 201 of the transformer, which is regulated by a fixed frequency PWM controller 102. A second circuit 900 comprises at least another secondary winding of the transformer.

Figure 9C:
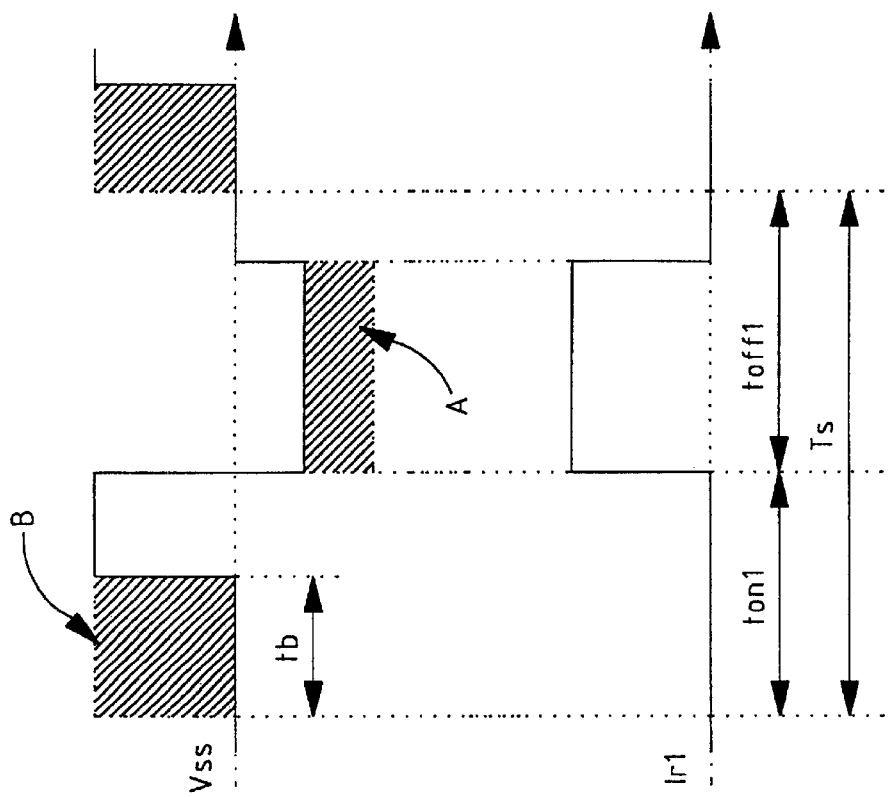
FIG. 9C shows the time diagrams of the voltage Vss and of the reset current Ir1 which are relative to the circuit scheme of FIG. 9A.
Figure 9B:
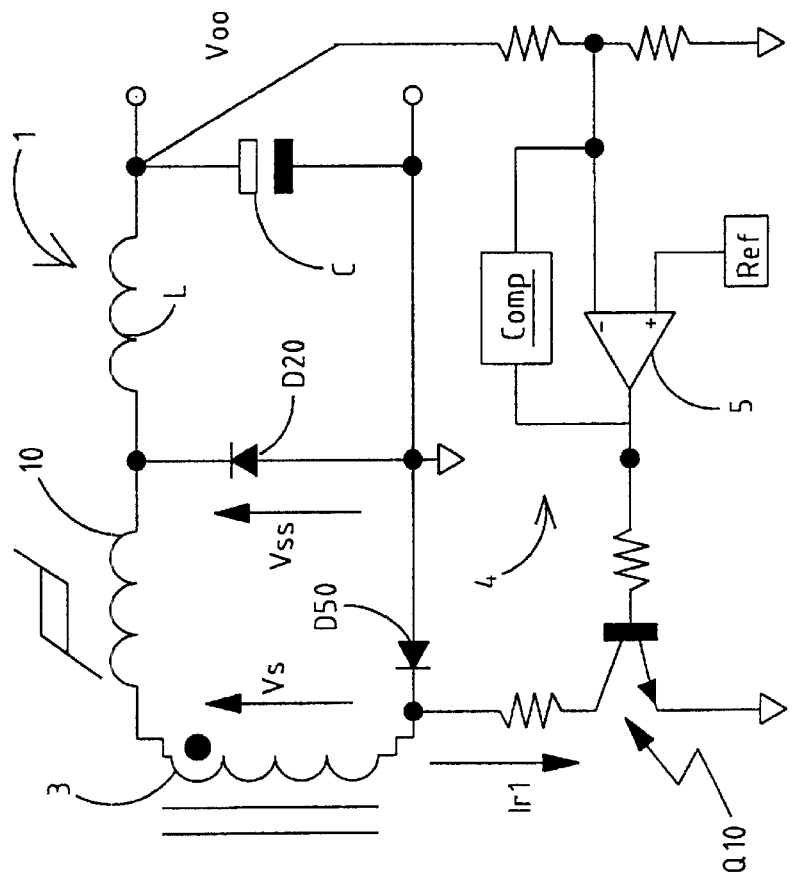
FIG. 9B is a circuit configuration of a circuit part of a switched mode power supply of FIG. 9A in the single-ended case according to a first embodiment of the invention.

In FIG. 9B the circuit 900 of the switched mode power supply of FIG. 9A in the single-ended case according a first embodiment of the invention, which is indicated in the present Figure with the reference number 1, is shown in more detail. Such circuit 1 comprises a secondary winding 3 of the transformer, a reactor 10 provided with a magnetic core and which is connected to the winding 3 and to a cathode of a diode D20 placed in parallel to a filter LC and which has the anode connected to ground. Another diode D50 is placed so that the anode is connected to the anode of the diode D20 and the cathode is connected to the other terminal of the secondary winding 3. A control circuit 4 is connected to the common terminal of the inductance L and of the capacitor C of the filter LC and it is connected to the cathode of the diode D50. The control circuit 4 comprises an operational amplifier 5 able to compare the output voltage Voo of the circuit with a reference voltage Ref and which has in feedback a block Comp able to stabilize the system. The output of the operational amplifier is coupled to the base terminal of an npn transistor Q10 which has the emitter terminal to ground and the collector terminal coupled to the cathode of the diode 50.

The operation of the circuit is the following. When the voltage Vs to the terminals of the secondary winding 3 is positive or zero, the npn transistor Q10 is off because the cathode of the diode D50 has a voltage value that is zero or lower than zero, respectively. When the voltage Vs is negative, the voltage value to the cathode of the diode D50 is positive with respect to ground and the npn transistor Q10 conducts, resetting to the saturable reactor 10. The current flowing in the npn transistor Q10 is controlled by means of the operational amplifier 5; any variation of the output voltage Voo of the circuit with respect to the reference voltage Ref causes a change of the reset current Ir1. The change of the reset current Ir1 causes a change of the volt/second value of the area B in FIG. 9C to allow the regulation of the output voltage Voo.

In FIG. 9C the time diagrams of the voltage Vss at the terminals of the diode D20 and of the reset current Ir1 are shown.

Figure 10:
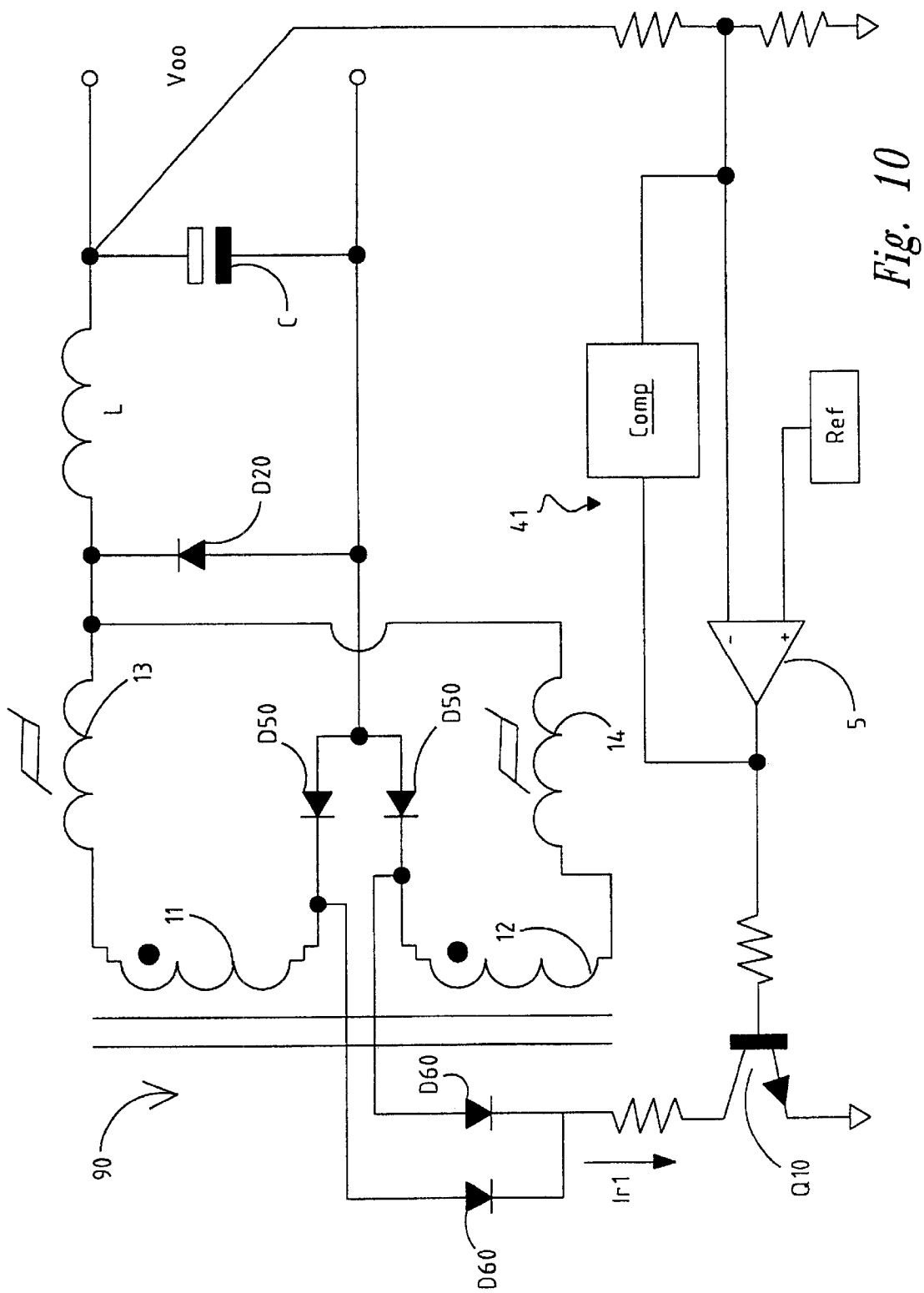
FIG. 10 is a circuit configuration of a circuit part of a switched mode power supply in the double-ended case according to a variant of the first embodiment of the invention.

In FIG. 10 the circuit 900 of the switched mode power supply of FIG. 9A in the double-ended case according to a variant of the first embodiment of the invention, which is indicated in the present Figure with the reference number 90, is shown in more detail. Such circuit 90 comprises two secondary windings 11, 12 of the transformer, two reactors 13, 14 each provided with a magnetic core and connected to the windings 11, 12 and both connected to the cathode of a diode D20 placed in parallel to a filter LG and which has the anode connected to ground. Two other diodes D50 are placed so that the anode of each of them is connected to the anode of the diode D20 and the cathode is connected to the other terminal of each of the windings 11, 12. A control circuit 41 is connected to the common terminal of the inductance L and of the capacitor C of the filter LC and it is connected to the cathodes of the diodes D50. The control circuit 41 is similar to the control circuit of FIG. 9B, but it differs because the collector terminal of the npn transistor Q10 is connected to the cathodes of two diodes D60 the anodes of which are connected to the cathodes of the diodes D50. The operation of the circuit shown in FIG. 10 is similar to that of the circuit shown in FIG. 9B.

In the circuits shown in FIGS. 9B and 10 the reset current Ir1 flows from a secondary winding terminal of the transformer and it is absorbed and not supplied as the known circuits, by the npn transistor Q10 which, working with a collector-emitter voltage value lower than that of the known circuits, causes an increase of the circuit efficiency.

Also the control circuit of FIGS. 9B and 10 does not need positive or negative supply voltages because one is obtained by the output voltage of the circuit and therefore regulated and the other is obtained by means of an auxiliary supply. Therefore the component number of the circuit is lower than that of the known circuits.

The circuit configurations shown in FIGS. 9B and 10 can be utilized both in the continuous inductor conduction mode (CCM) case and in the discontinuous inductor conduction mode (DCM) case.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A switched mode power supply, comprising:
 a first circuit provided with a primary winding of a transformer to which a pulse voltage is applied, at least one second circuit comprising at least one secondary winding of said transformer, at least one reactor provided with a magnetic core and having a terminal connected to a first terminal of said at least one secondary winding, at least one filter provided with input and output terminals and a first diode connected in parallel to the input terminals of the filter;
 the other terminal of said at least one reactor is connected to a first terminal of said first diode; and
 a second diode having a first terminal connected to a second terminal of said first diode and a second terminal connected to a second terminal of said at least one secondary winding and a control circuit coupled to a output terminal of said filter and to the second terminal of said at least one secondary winding, said control circuit adapted to generate a current to reset said magnetic core of said at least one reactor, the reset current flowing from the secondary winding and into the control circuit.

2. The power supply of claim 1, wherein said control circuit comprises a comparator configured to compare an output voltage of said second circuit with a reference voltage, and a transistor controlled by an output signal of said comparator and which generates said reset current for said magnetic core of said at least one reactor.

3. The power supply of claim 2, wherein said transistor is a npn bipolar transistor having a collector terminal coupled to said second terminal of said at least one secondary winding, an emitter terminal connected to ground, and a base terminal coupled to an output terminal of said comparator.

4. The power supply of claim 2, wherein said comparator comprises an operational amplifier and a stabilization block placed in feedback to the operational amplifier.

5. The power supply of claim 1, wherein said at least one secondary winding is a single secondary winding, said at least one reactor is a single reactor, and said at least one second diode is a single diode.

6. The power supply of claim 1 wherein said at least one secondary winding comprises two secondary windings, said at least one reactor comprises two reactors, and said at least one second diode comprises two diodes and said at least one second circuit comprises a third and a fourth diode, each having an anode coupled to said second terminal of each secondary windings and a cathode coupled to said control circuit.

7. The power supply of claim 1, comprising a third circuit provided with another secondary winding of said transformer and a PWM controller placed between the output of said third circuit and the first circuit, said PWM controller configured to regulate a voltage output signal of said third circuit with respect to each change of an input voltage of said first circuit and to each variation of a load placed in output to said third circuit.

8. The power supply of claim 1, wherein said filter of said second circuit is a LC filter.

9. The power supply of claim 1, wherein said first terminal of said first diode is the cathode of said first diode and said second terminal of said first diode is the anode of said first diode, and said first terminal of said second diode is the anode of said second diode and said second terminal of said second diode is the cathode of said second diode.

10. A switched mode power supply, comprising:
a primary winding circuit;
a secondary winding circuit comprising a secondary winding coupled to a reactor having a magnetic core;
a filter circuit coupled in parallel to a first diode and having a first input terminal coupled to the secondary winding and a second input terminal coupled to the reactor;
a second diode having a cathode coupled to the secondary winding and an anode coupled to the first input terminal of the filter circuit; and a
control circuit coupled to an output of the filter circuit and coupled to a node formed by the connection of the secondary winding to the cathode of the second diode, the control circuit configured to generate a current to reset the magnetic core of the reactor, the reset current flowing from the secondary winding into the control circuit.

11. The switched mode power supply of claim 10, wherein the control circuit comprises a comparator configured to compare an output voltage of the secondary winding circuit with a reference voltage, and a transistor controlled by an output signal of the comparator to generate a reset current for the magnetic core of the reactor.

12. The switched mode power supply of claim 10, wherein the filter comprises an inductive element coupled to a capacitive element, and the cathode of the first diode is coupled to the inductive element and the anode of the first diode is coupled to the capacitive element.

13. The switched mode power supply of claim 12, wherein the control circuit is coupled to a node formed by the connection of the inductive element and the capacitive element.

14. A switched mode power supply, comprising:
a first secondary winding circuit comprising a first secondary winding coupled to a reactor having a magnetic core, a filter circuit coupled in parallel to a first diode and having a first input terminal coupled to the secondary winding and a second input terminal coupled to the reactor;
a second diode having a cathode coupled to the first secondary winding and an anode coupled to the first input terminal of the filter circuit;
a second secondary winding circuit comprising a second secondary winding series coupled to a second reactor having a magnetic core, the second reactor coupled to the first reactor and the second secondary winding coupled to the first secondary winding via a third diode having an anode coupled to the anode of the second diode; and
a control circuit coupled to an output of the filter circuit and coupled to cathodes of fourth and fifth diodes that each have an anode coupled to a respective cathode of the second and third diodes.

15. The switched mode power supply of claim 14, wherein the control circuit comprises a comparator configured to compare an output voltage of the filter circuit with a reference voltage, and a transistor controlled by an output signal of the comparator to generate a reset current for the magnetic core of the first and second reactors.

16. The switched mode power supply of claim 14, wherein the filter circuit comprises an inductive element connected to a capacitive element, and the first diode comprises a cathode coupled to the inductive element and an anode coupled to the capacitive element.

17. The switched mode power supply of claim 15, wherein the control circuit is coupled to a node formed by the connection of the inductive element and the capacitive element.

18. A switched mode power supply, comprising:
a first circuit provided with a primary winding of a transformer to which a pulse voltage is applied, at least one second circuit comprising at least one secondary winding of said transformer, at least one reactor provided with a magnetic core and having a terminal connected to a first terminal of said at least one secondary winding, at least one filter provided with input and output terminals and a first diode connected in parallel to the input terminals of the filter;
the other terminal of said at least one reactor is connected to a first terminal of said first diode; and
a second diode having a first terminal connected to a second terminal of said first diode and a second terminal connected to a second terminal of said at least one secondary winding and a control circuit coupled to a output terminal of said filter and to the second terminal of said at least one secondary winding, said control circuit adapted to generate a current to reset said magnetic core of said at least one reactor, wherein said at least one secondary winding comprises two secondary windings, said at least one reactor comprises two reactors, and said at least one second diode comprises two diodes and said at least one second circuit comprises a third and a fourth diode, each having an anode coupled to said second terminal of each secondary windings and a cathode coupled to said control circuit.

19. A switched mode power supply, comprising:
a first circuit provided with a primary winding of a transformer to which a pulse voltage is applied, at least one second circuit comprising at least one secondary winding of said transformer, at least one reactor provided with a magnetic core and having a terminal connected to a first terminal of said at least one secondary winding, at least one filter provided with input and output terminals and a first diode connected in parallel to the input terminals of the filter;

the other terminal of said at least one reactor is connected to a first terminal of said first diode; and a second diode having a first terminal connected to a second terminal of said first diode and a second terminal connected to a second terminal of said at least one secondary winding and a control circuit coupled to a output terminal of said filer and to the second terminal of said at least one secondary winding, said control circuit adapted to generate a current to reset said magnetic core of said at least one reactor, and further comprising a third circuit provided with another secondary winding of said transformer and a PWM controller placed between the output of said third circuit and the first circuit, said PWM controller configured to regulate a voltage output signal of said third circuit with respect to each change of an input voltage of said first circuit and to each variation of a load placed in output to said third circuit.

* * * * *